United States Patent
Yamada et al.

(10) Patent No.: US 8,396,442 B2
(45) Date of Patent: Mar. 12, 2013

(54) WIRELESS COMMUNICATION APPARATUS CAPABLE OF RAPIDLY CHANGING DIRECTIONAL PATTERNS OF MULTIPLE STEERABLE ANTENNA APPARATUSES

(75) Inventors: Toyoshi Yamada, Osaka (JP); Osamu Tanaka, Osaka (JP); Wataru Noguchi, Hyogo (JP); Nobuhiko Arashin, Osaka (JP); Hiroyuki Yurugi, Osaka (JP); Masahiko Nagoshi, Osaka (JP); Akihiko Shiotsuki, Osaka (JP)

(73) Assignee: Panasonic Corporation, Osaka (JP)

( * ) Notice: Subject to any disclaimer, the term of this patent is extended or adjusted under 35 U.S.C. 154(b) by 85 days.

(21) Appl. No.: 13/147,916

(22) PCT Filed: Jun. 10, 2010

(86) PCT No.: PCT/JP2010/003865
§ 371 (c)(1),
(2), (4) Date: Aug. 4, 2011

(87) PCT Pub. No.: WO2010/143432
PCT Pub. Date: Dec. 16, 2010

(65) Prior Publication Data
US 2012/0028596 A1    Feb. 2, 2012

(30) Foreign Application Priority Data
Jun. 12, 2009   (JP) ................................. 2009-140793

(51) Int. Cl.
*H04B 1/16* (2006.01)
(52) U.S. Cl. .... 455/337; 455/562.1; 455/82; 455/575.7; 455/115.3; 342/386; 343/700 MS

(58) Field of Classification Search .................. 455/337, 455/562.1, 82, 575.7, 115.3; 342/386; 343/700 MS
See application file for complete search history.

(56) References Cited

U.S. PATENT DOCUMENTS
(Continued)

FOREIGN PATENT DOCUMENTS
| EP | 2 173 049 | 4/2010 |
| JP | 2000-134023 | 5/2000 |

(Continued)

OTHER PUBLICATIONS

International Search Report issued Aug. 31, 2010 in International (PCT) Application No. PCT/JP2010/003865.

(Continued)

*Primary Examiner* — Sanh Phu
(74) *Attorney, Agent, or Firm* — Wenderoth, Lind & Ponack, L.L.P.

(57) ABSTRACT

A directional pattern table memory stores combined directional pattern groups in each of which combined directional patterns are ordered by different predetermined priority according to a different radio propagation environment. A controller computes a communication performance expected value based on RSSIs for when an initial combined directional pattern is set on steerable antenna apparatuses; selects one combined directional pattern group based on relative strengths of RSSIs; and according to the priority, sequentially sets combined directional patterns of the selected one combined directional pattern group, on the steerable antenna apparatuses, computes a communication performance value based on a PHY rate and a PER at each of sequential settings, and performs communication using a combined directional pattern with a communication performance value that first exceeds the communication performance expected value.

8 Claims, 11 Drawing Sheets

U.S. PATENT DOCUMENTS

| | | | |
|---|---|---|---|
| 7,230,579 B2 * | 6/2007 | De Ruijter | 343/844 |
| 7,652,625 B2 * | 1/2010 | Small | 342/386 |
| 8,095,069 B2 * | 1/2012 | Maltsev et al. | 455/41.2 |
| 8,248,970 B2 * | 8/2012 | Abramov et al. | 370/260 |
| 2002/0068590 A1 | 6/2002 | Suzuki et al. | |
| 2003/0228857 A1 | 12/2003 | Maeki | |
| 2005/0170800 A1 | 8/2005 | Taromaru et al. | |
| 2006/0217091 A1 | 9/2006 | Tsukio et al. | |
| 2006/0234776 A1 | 10/2006 | Ishihara et al. | |
| 2007/0087787 A1 | 4/2007 | Washiro | |
| 2007/0273584 A1 | 11/2007 | Kisigami et al. | |

FOREIGN PATENT DOCUMENTS

| | | |
|---|---|---|
| JP | 2004-15800 | 1/2004 |
| JP | 2005-217849 | 8/2005 |
| JP | 2006-237936 | 9/2006 |
| JP | 2008-160532 | 7/2008 |
| WO | 2009/001552 | 12/2008 |

OTHER PUBLICATIONS

International Preliminary Report on Patentability issued Jan. 26, 2012 in International (PCT) Application No. PCT/JP2010/003865.

* cited by examiner

Fig. 10

| RELATIVE STRENGTHS OF RECEIVED SIGNALS | COMBINED DIRECTIONAL PATTERN (HIGH PRIORITY ← → LOW PRIORITY) | | | | | | | |
|---|---|---|---|---|---|---|---|---|
| RSSI1≒RSSI2≒RSSI3 | Ph | Pa | Pe | Pf | Pg | Pb | Pc | Pd |
| RSSI1>RSSI2>RSSI3 | Pc | Pg | Pd | Ph | Pe | Pf | Pb | Pa |
| RSSI1>RSSI2≒RSSI3 | Pd | Pg | Pc | Ph | Pe | Pf | Pb | Pa |
| RSSI1>RSSI3>RSSI2 | Pg | Pc | Pd | Ph | Pf | Pe | Pb | Pa |
| RSSI1≒RSSI2>RSSI3 | Pc | Pg | Pe | Ph | Pe | Pd | Pd | Pa |
| RSSI1≒RSSI3>RSSI2 | Pd | Pg | Pf | Ph | Pf | Pb | Pc | Pa |
| RSSI2>RSSI3>RSSI1 | Pb | Pe | Pc | Ph | Pg | Pf | Pd | Pa |
| RSSI2>RSSI1>RSSI3 | Pc | Pe | Pb | Ph | Pg | Pf | Pd | Pa |
| RSSI2≒RSSI3>RSSI1 | Pe | Pe | Pf | Ph | Pg | Pf | Pd | Pa |
| RSSI3>RSSI1>RSSI2 | Pd | Pe | Pb | Ph | Pg | Pc | Pc | Pa |
| RSSI3>RSSI2>RSSI1 | Pf | Pd | Pb | Ph | Pf | Pe | Pc | Pa |
| RSSI3≒RSSI1≒RSSI2 | Pf | Pb | Pd | Ph | Pe | Pe | Pc | Pa |

Fig.12

| RELATIVE STRENGTHS OF RECEIVED SIGNALS | COMBINED DIRECTIONAL PATTERN (HIGH PRIORITY ← → LOW PRIORITY) | | | | | | |
|---|---|---|---|---|---|---|---|
| $RSSI11 \fallingdotseq RSSI21$<br>$RSSI12 \fallingdotseq RSSI22$<br>$RSSI13 \fallingdotseq RSSI23$ | Ph | Pa | Pe | Ph | Pg | Pb | Pc | Pd |
| $RSSI11 > RSSI21$<br>$RSSI12 \fallingdotseq RSSI22$<br>$RSSI13 \fallingdotseq RSSI23$ | Pg | Pa | Pc | Pd | Ph | Pe | Pf | Pb |
| $RSSI11 < RSSI21$<br>$RSSI12 \fallingdotseq RSSI22$<br>$RSSI13 \fallingdotseq RSSI23$ | Ph | Pb | Pe | Pf | Pg | Pc | Pd | Pa |
| $RSSI11 \fallingdotseq RSSI21$<br>$RSSI12 > RSSI22$<br>$RSSI13 \fallingdotseq RSSI23$ | Pe | Pa | Pb | Pc | Ph | Pf | Pg | Pd |
| $RSSI11 > RSSI21$<br>$RSSI12 > RSSI22$<br>$RSSI13 \fallingdotseq RSSI23$ | Pc | Pa | Pe | Pg | Ph | Pb | Pd | Pf |
| $RSSI11 < RSSI21$<br>$RSSI12 > RSSI22$<br>$RSSI13 \fallingdotseq RSSI23$ | Pe | Ph | Ph | Pf | Pc | Pa | Pg | Pd |
| $RSSI11 \fallingdotseq RSSI21$<br>$RSSI12 < RSSI22$<br>$RSSI13 \fallingdotseq RSSI23$ | Ph | Pd | Pf | Pg | Pe | Pc | Pb | Pa |
| ⋮ | | | | | | | |
| $RSSI11 < RSSI21$<br>$RSSI12 < RSSI22$<br>$RSSI13 < RSSI23$ | Ph | Pe | Pf | Pg | Pb | Pc | Pd | Pa | ved
WIRELESS COMMUNICATION APPARATUS CAPABLE OF RAPIDLY CHANGING DIRECTIONAL PATTERNS OF MULTIPLE STEERABLE ANTENNA APPARATUSES

TECHNICAL FIELD

The present invention relates to a wireless communication apparatus and a wireless communication method for rapidly changing the directional patterns of a plurality of steerable antenna apparatuses in response to a change in radio propagation environment.

BACKGROUND ART

As the Internet has been widely used and the digital video and music contents have been used in recent years, more and more apparatuses with network capability have appeared, including not only information terminals such as personal computers, but also various household electrical appliances. When connecting information terminals such as personal computers for office use, a wired connection using an Ethernet (registered trademark) cable is mainly used. On the other hand, when connecting household electrical appliances or connecting a household electrical appliance and another information terminal, a wireless connection is required in consideration of the flexibility in arrangement, and restrictions on the size of small apparatuses such as digital still cameras. However, in a wireless connection, the transmission performance may significantly degrade or change due to a state of the radio propagation environment or a change in the state. As means for reducing the influence of such a change in the state of the radio propagation environment, there is a method of controlling the directional patterns of transmitting and receiving antennas provided on an information terminal or a household electrical appliance, according to the radio propagation environment.

In an antenna steering control system disclosed in Patent Literature 1, a transmitting apparatus transmits a measurement signal to a receiving apparatus, for determining a radio propagation delay time. Upon receiving the measurement signal, the receiving apparatus controls its antenna control means to change the beam width of each antenna element in a steerable receiving antenna of the receiving apparatus to be the widest. The receiving apparatus continues to receive the measurement signal with the beam widths being widest, separates the measurement signal into a direct wave and delay waves, and computes the delay spread. Based on the computation result, the receiving apparatus controls the directional pattern of the steerable antenna to an optimum pattern.

CITATION LIST

Patent Literature

PATENT LITERATURE 1: Japanese Patent Laid-open Publication No. 2000-134023.

SUMMARY OF INVENTION

Technical Problem

In the antenna steering control system disclosed in Patent Literature 1, the transmitting apparatus not only performs main data communication, but also needs to periodically transmit the measurement signals to the receiving apparatus, for determining the directional pattern of the steerable antenna. Since the process of changing the directional patterns of the steerable antenna at the receiving apparatus is started by the transmitting apparatus, it is not possible to detect a change in radio propagation environment at the receiving apparatus, and thus, it is difficult to follow changes in radio propagation environment at the receiving apparatus. In addition, in the case of transmitting measurement signals at short intervals in order to rapidly follow changes in radio propagation environment at the receiving apparatus, communications other than the main data communication is frequently performed, resulting in a reduction in throughput.

An object of the present invention is to solve the above-described problems, and provide a wireless communication apparatus capable of rapidly changing the directional patterns of a plurality of steerable antenna apparatuses in response to a change in radio propagation environment, and provide a wireless communication method for such a wireless communication apparatus.

Solution to Problem

According to the first aspect of the present invention, a wireless communication apparatus is provided. The wireless communication apparatus is provided with: a plurality of steerable antenna apparatuses; directional pattern storage means for storing a plurality of combined directional patterns, each of the combined directional patterns being a superposition of a plurality of directional patterns set on the plurality of steerable antenna apparatuses, respectively; control means for controlling directional patterns of the respective steerable antenna apparatuses to set a combined directional pattern stored in the directional pattern storage means; and demodulation means for demodulating a plurality of signals received by the plurality of steerable antenna apparatuses, respectively. The directional pattern storage means stores the plurality of combined directional patterns so as to be ordered by predetermined priority. The control means computes a communication performance expected value based on a first radio propagation environment parameter for signals received when a predetermined initial combined directional pattern is set on the steerable antenna apparatuses. The control means sequentially sets the plurality of combined directional patterns on the steerable antenna apparatuses according to the priority, computes a communication performance value based on a second radio propagation environment parameter for signals received at each of sequential settings, and performs communication using a combined directional pattern with a communication performance value that first exceeds the communication performance expected value.

In the wireless communication apparatus, the directional pattern storage means stores the plurality of combined directional patterns so as to form a plurality of combined directional pattern groups in each of which the plurality of combined directional patterns are ordered by different predetermined priority according to a different radio propagation environment. The control means selects one of the combined directional pattern groups based on the first radio propagation environment parameter. The control means, according to the priority, sequentially sets respective combined directional patterns included in the selected one combined directional pattern group, on the steerable antenna apparatuses, computes a communication performance value based on the second radio propagation environment parameter for signals received at each of sequential settings, and performs communication using a combined directional pattern with a communication performance value that first exceeds the communication performance expected value.

In the wireless communication apparatus, the first radio propagation environment parameter includes received signal strengths of signals received by the respective steerable antenna apparatuses. The second radio propagation environment parameter includes a wireless physical transmission rate and a packet error rate of signals received and demodulated.

In the wireless communication apparatus, the directional pattern storage means stores the plurality of combined directional patterns so as to form the plurality of combined directional pattern groups each corresponding to a different combination of relative strengths of received signal strengths of signals received by the respective steerable antenna apparatuses. The control means selects one of the combined directional pattern groups based on relative strengths of received signal strengths of signals received by the respective steerable antenna apparatuses when the initial combined directional pattern is set on the steerable antenna apparatuses.

In the wireless communication apparatus, the initial directional pattern includes a first initial directional pattern and a second initial directional pattern different from each other. The directional pattern storage means stores the plurality of combined directional patterns so as to form the plurality of combined directional pattern groups each corresponding to a different combination of relative strengths of received signal strengths of signals received by the respective steerable antenna apparatuses when the first initial combined directional pattern is set on the steerable antenna apparatuses, to received signal strengths of signals received by the respective steerable antenna apparatuses when the second initial combined directional pattern is set on the steerable antenna apparatuses. The control means selects one of the combined directional pattern groups based on relative strengths of received signal strengths of signals received by the respective steerable antenna apparatuses when the first initial combined directional pattern is set on the steerable antenna apparatuses, to received signal strengths of signals received by the respective steerable antenna apparatuses when the second initial combined directional pattern is set on the steerable antenna apparatuses.

In the wireless communication apparatus, the initial combined directional pattern is an omni-directional pattern.

In the wireless communication apparatus, the first initial combined directional pattern is an omni-directional pattern, and the second initial combined directional pattern is a directional pattern different from an omni-directional pattern.

According to the second aspect of the present invention, a wireless communication method for controlling directional patterns of a plurality of steerable antenna apparatuses in a wireless communication apparatus is provided. The wireless communication apparatus is provided with: the plurality of steerable antenna apparatuses; directional pattern storage means for storing a plurality of combined directional patterns, each of the combined directional patterns being a superposition of a plurality of directional patterns set on the plurality of steerable antenna apparatuses, respectively; demodulation means for demodulating a plurality of signals received by the plurality of steerable antenna apparatuses, respectively. The wireless communication method includes the steps of: storing the plurality of combined directional patterns in the directional pattern storage means so as to be ordered by predetermined priority; computing a communication performance expected value based on a first radio propagation environment parameter for signals received when a predetermined initial combined directional pattern is set on the steerable antenna apparatuses; and sequentially setting the plurality of combined directional patterns on the steerable antenna apparatuses according to the priority, computing a communication performance value based on a second radio propagation environment parameter for signals received at each of sequential settings, and performing communication using a combined directional pattern with a communication performance value that first exceeds the communication performance expected value.

In the wireless communication method, the storing step includes storing the plurality of combined directional patterns in the directional pattern storage means so as to form a plurality of combined directional pattern groups in each of which the plurality of combined directional patterns are ordered by different predetermined priority according to a different radio propagation environment. The wireless communication method further includes the step of selecting one of the combined directional pattern groups based on the first radio propagation environment parameter. The step of performing communication further includes: according to the priority, sequentially setting respective combined directional patterns included in the selected one combined directional pattern group, on the steerable antenna apparatuses; computing a communication performance value based on the second radio propagation environment parameter for signals received at each of sequential settings; and performing communication using a combined directional pattern with a communication performance value that first exceeds the communication performance expected value.

In the wireless communication method, the first radio propagation environment parameter includes received signal strengths of signals received by the respective steerable antenna apparatuses. The second radio propagation environment parameter includes a wireless physical transmission rate and a packet error rate of signals received and demodulated.

In the wireless communication method, the step of storing includes storing the plurality of combined directional patterns in the directional pattern storage means so as to form the plurality of combined directional pattern groups each corresponding to a different combination of relative strengths of received signal strengths of signals received by the respective steerable antenna apparatuses. The step of selecting includes selecting one of the combined directional pattern groups based on relative strengths of received signal strengths of signals received by the respective steerable antenna apparatuses when the initial combined directional pattern is set on the steerable antenna apparatuses.

In the wireless communication method, the initial directional pattern includes a first initial directional pattern and a second initial directional pattern different from each other. The step of storing includes storing the plurality of combined directional patterns in the directional pattern storage means so as to form the plurality of combined directional pattern groups each corresponding to a different combination of relative strengths of received signal strengths of signals received by the respective steerable antenna apparatuses when the first initial combined directional pattern is set on the steerable antenna apparatuses, to received signal strengths of signals received by the respective steerable antenna apparatuses when the second initial combined directional pattern is set on the steerable antenna apparatuses. The step of selecting includes selecting one of the combined directional pattern groups based on relative strengths of received signal strengths of signals received by the respective steerable antenna apparatuses when the first initial combined directional pattern is set on the steerable antenna apparatuses, to received signal strengths of signals received by the respective steerable antenna apparatuses when the second initial combined directional pattern is set on the steerable antenna apparatuses.

In the wireless communication method, the initial combined directional pattern is an omni-directional pattern.

In the wireless communication method, the first initial combined directional pattern is an omni-directional pattern, and the second initial combined directional pattern is a directional pattern different from an omni-directional pattern.

Advantageous Effects of Invention

The wireless communication apparatus and wireless communication method of the present invention can rapidly change the directional patterns of steerable antenna apparatuses in response to a change in radio propagation environment, thus enabling stable data communication.

BRIEF DESCRIPTION OF DRAWINGS

FIG. 10 is a table showing the content of a directional pattern table memory 104 of FIG. 1.

FIG. 12 is a table showing the content of a directional pattern table memory 104 according to a second embodiment of the present invention.

DESCRIPTION OF EMBODIMENTS

Preferred embodiments of the present invention will be described below with reference to the drawings.

First Embodiment

Figure 1:
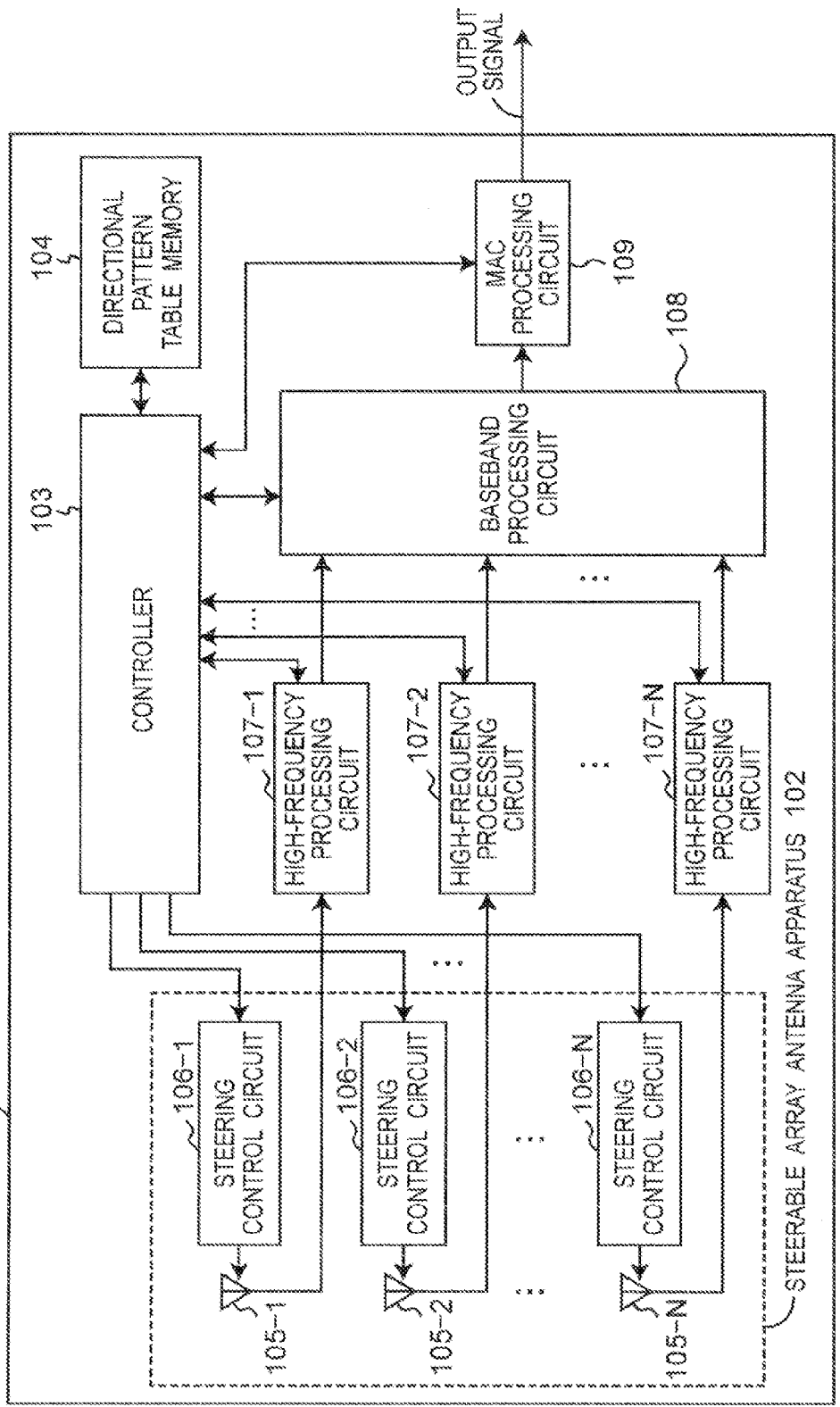
FIG. 1 is a block diagram showing a configuration of a wireless communication apparatus 101 according to a first embodiment of the present invention.
Figure 2:
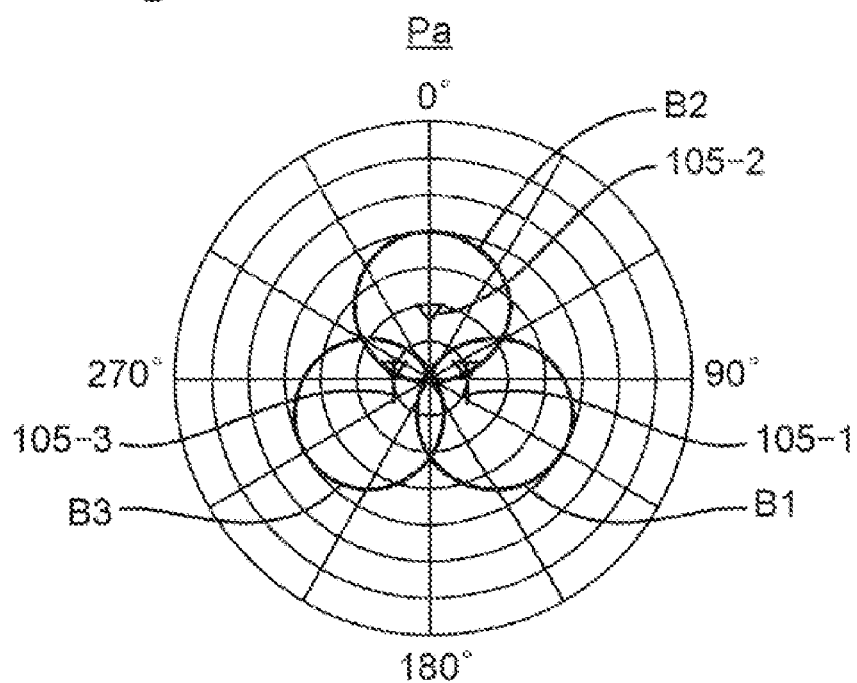
FIG. 2 is a pattern diagram showing a first combined directional pattern Pa to be set on steerable antenna elements 105-1 to 105-3 of FIG. 1.
Figure 3:
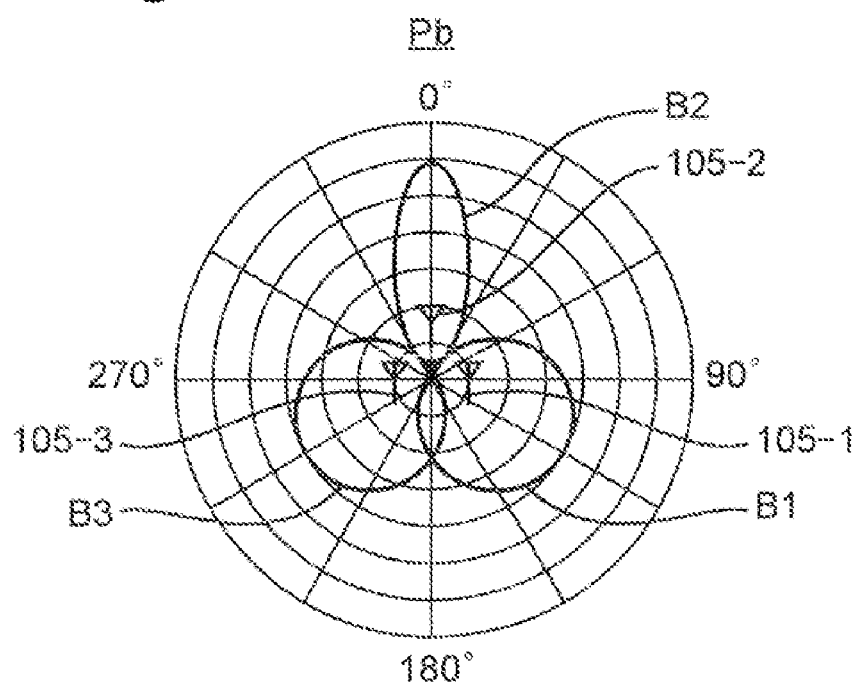
FIG. 3 is a pattern diagram showing a second combined directional pattern Pb to be set on the steerable antenna elements 105-1 to 105-3 of FIG. 1.
Figure 4:
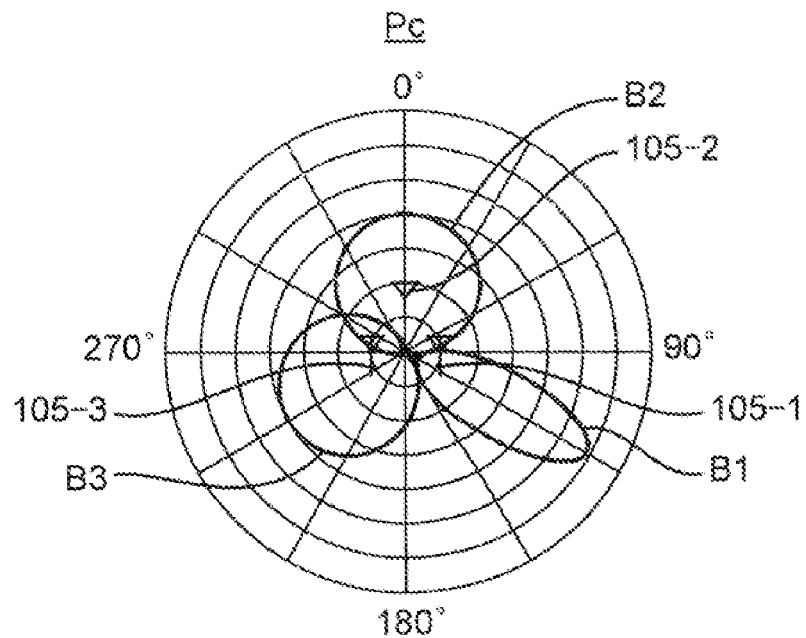
FIG. 4 is a pattern diagram showing a third combined directional pattern Pc to be set on the steerable antenna elements 105-1 to 105-3 of FIG. 1.
Figure 5:
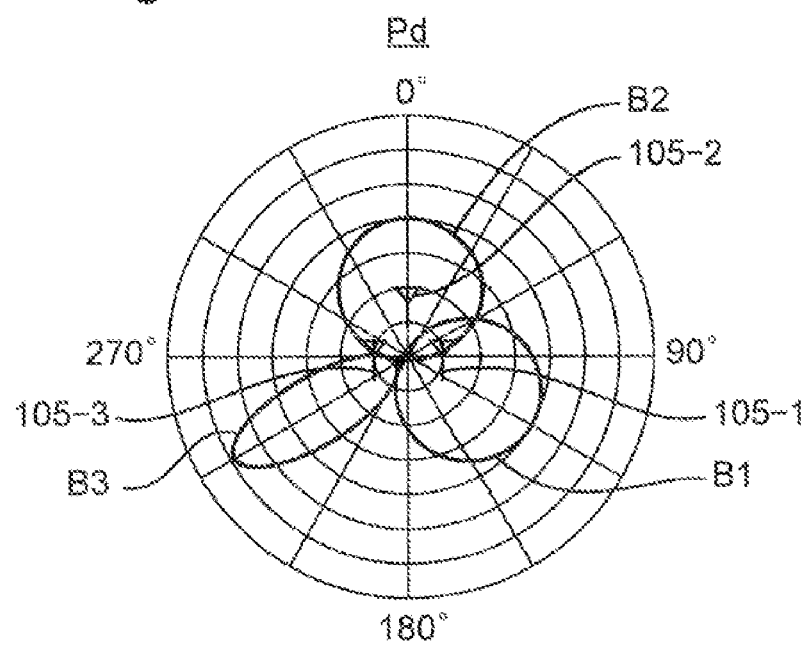
FIG. 5 is a pattern diagram showing a fourth combined directional pattern Pd to be set on the steerable antenna elements 105-1 to 105-3 of FIG. 1.
Figure 6:
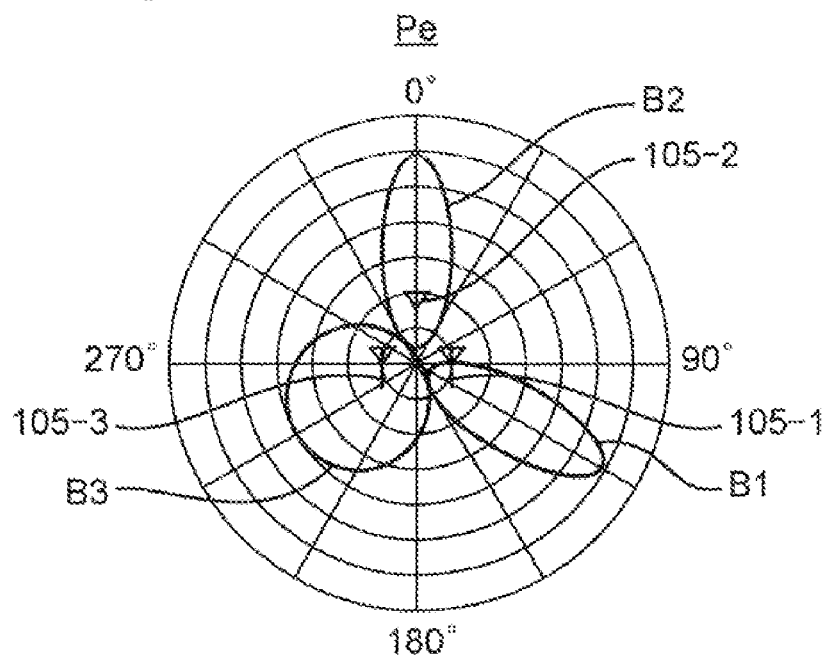
FIG. 6 is a pattern diagram showing a fifth combined directional pattern Pc to be set on the steerable antenna elements 105-1 to 105-3 of FIG. 1.
Figure 7:
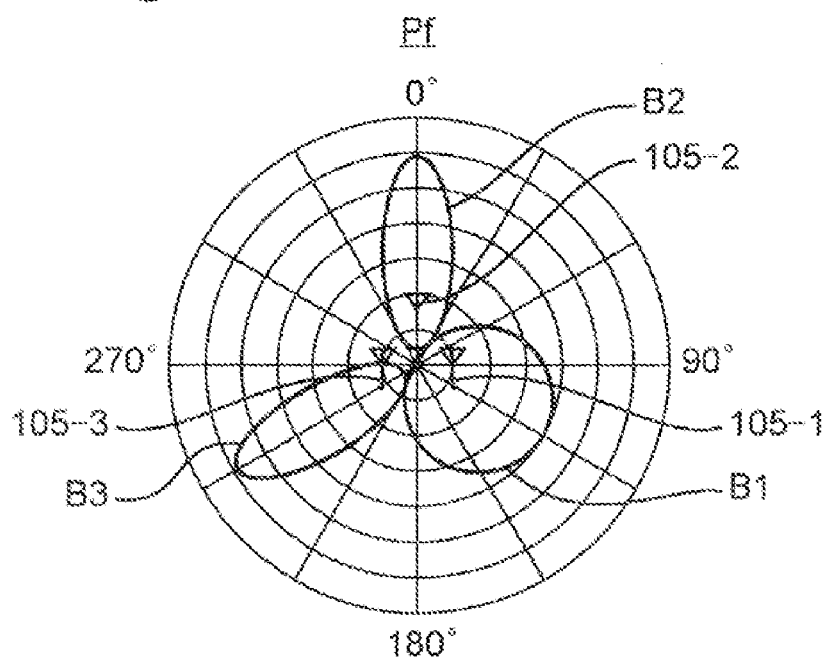
FIG. 7 is a pattern diagram showing a sixth combined directional pattern Pf to be set on the steerable antenna elements 105-1 to 105-3 of FIG. 1.
Figure 8:
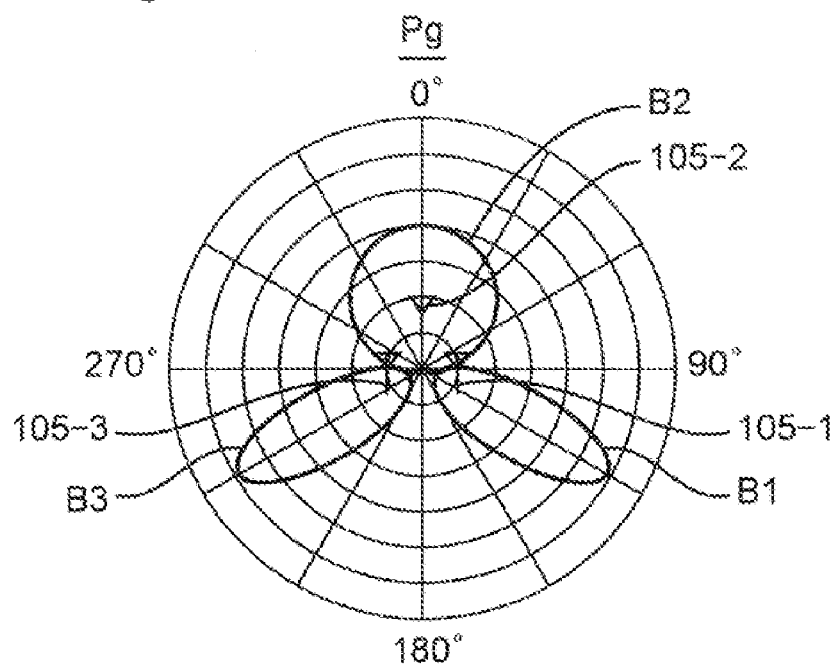
FIG. 8 is a pattern diagram showing a seventh combined directional pattern Pg to be set on the steerable antenna elements 105-1 to 105-3 of FIG. 1.
Figure 9:
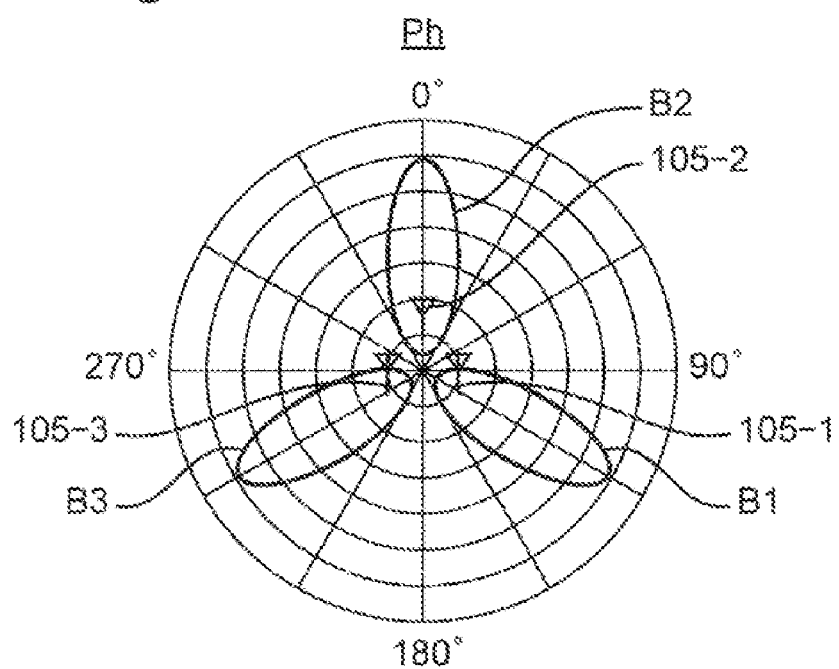
FIG. 9 is a pattern diagram showing an eighth combined directional pattern Ph to be set on the steerable antenna elements 105-1 to 105-3 of FIG. 1.

FIG. 1 is a block diagram showing a configuration of a wireless communication apparatus 101 according to a first embodiment of the present invention. The wireless communication apparatus 101 is configured to include: a steerable array antenna apparatus 102 including a plurality of steerable antenna elements 105-1 to 105-N and steering control circuits 106-1 to 106-N; high-frequency processing circuits 107-1 to 107-N; a baseband processing circuit 108; a MAC (Media Access Control) processing circuit 109; a controller 103; and a directional pattern table memory 104.

The directional patterns of the respective steerable antenna elements 105-1 to 105-N are controlled by their corresponding steering control circuits 106-1 to 106-N. Thus, the steerable antenna elements 105-1 to 105-N and the steering control circuits 106-1 to 106-N operate as a plurality of steerable antenna apparatuses. For example, in the case that each of the steerable antenna elements is provided with an active antenna element and one or more parasitic elements, the directional pattern of each of the steerable antenna elements 105-1 to 105-N is changed by, for example, switching the parasitic element close to the active antenna element on and off. In this specification, a combination of a plurality of N directional patterns each set on a corresponding one of the steerable antenna elements 105-1 to 105-N (i.e., a superposition of directional patterns) is referred to as "combined directional pattern". The directional pattern table memory 104 stores data for setting a plurality of different combined directional patterns, each including different directional patterns (details will be described later). Thus, one of the combined directional patterns stored in the directional pattern table memory 104 is selectively set on the steerable antenna elements 105-1 to 105-N.

Now, the operation of the wireless communication apparatus 101 will be described. Each packet in a plurality of data streams transmitted from a transmitting wireless terminal apparatus (not shown) using a MIMO transmission scheme arrives at and is received by the plurality of N steerable antenna elements 105-1 to 105-N. Then, the received data streams are processed by the high-frequency processing circuits 107-1 to 107-N, e.g. for amplification and A/D conversion, and thereafter, passed to the baseband processing circuit 108 for demodulation. The baseband processing circuit 108 reconstructs one original data stream from the N data streams. The reconstructed data stream is subject to MAC processing of the MAC processing circuit 109, and then, the processed data stream is outputted from the wireless communication apparatus 101, as an output signal. The controller 103 inputs control signals to the steering control circuits 106-1 to 106-N, the control signals being associated with one of the combined directional patterns stored in the directional pattern table memory 104, and thus, the controller 103 allows the steering control circuits 106-1 to 106-N to control the directional patterns of the steerable antenna elements 105-1 to 105-N to obtain the combined directional pattern. Specifically, the controller 103 performs a directional pattern determination process, which will be described later, and thus, determines an optimum combined directional pattern from among the combined directional patterns stored in the directional pattern table memory 104, and sets the optimum combined directional pattern on the steerable antenna elements 105-1 to 105-N. Further, in order to perform the directional pattern determination process, the controller 103 obtains and uses certain radio propagation environment parameters from at least one of the high-frequency processing circuits 107-1 to 107-N, the baseband processing circuit 108, and the MAC processing circuit 109. For the radio propagation environment parameters, for example, it is possible to use the received signal strengths (hereinafter, referred to as "RSSIs") of signals received by the respective steerable antenna elements 105-1 to 105-N, and the wireless physical transmission rate (hereinafter, referred to as "PHY rate") and packet error rate (hereinafter, referred to as "PER") of signals received and demodulated, but not limited thereto.

Hereinafter, a directional pattern determination method according to the embodiment of the present invention will be described, using an exemplary case in which the wireless communication apparatus 101 of FIG. 1 is provided with three steerable antenna elements 105-1 to 105-3, three steering control circuits 106-1 to 106-3, and three high-frequency processing circuits 107-1 to 107-3 (i.e., N=3) and receives packets under a MIMO transmission scheme.

FIGS. 2 to 9 are pattern diagrams showing combined directional patterns Pa to Ph to be set on the steerable antenna elements 105-1 to 105-3 of FIG. 1. Each of FIGS. 2 to 9 respectively shows a schematic combined directional pattern of a polarized component in a plane where the steerable array antenna apparatus 102 is provided, e.g., a vertical polarized component in an XY plane. Directional patterns B1 to B3 are set on the steerable antenna elements 105-1 to 105-3, respectively. Each of the combined directional patterns Pa to Ph is a combination of these three directional patterns 131 to B3 (i.e., a superposition of directional patterns). The combined directional patterns Pa to Ph only need to be different from each other, and are not limited to those shown in FIGS. 2 to 9.

FIG. 10 is a table showing the content of the directional pattern table memory 104 of FIG. 1. In the present embodiment, the directional pattern table memory 104 stores the combined directional patterns Pa to Ph to form a plurality of combined directional pattern groups in each of which the combined directional patterns Pa to Ph are ordered by different predetermined priority according to a different radio propagation environment. Specifically, the combined directional patterns Pa to Ph are ordered by priority that is used when being set on the steerable antenna elements 105-1 to 105-3, and are stored in the directional pattern table memory 104. In addition, the combined directional patterns Pa to Ph are assigned different priorities according to the relative strengths of received signals received by the respective steerable antenna elements 105-1 to 105-3 (i.e., the relative strengths of RSSI1, RSSI2, and RSSI3 which are RSSIs for the respective steerable antenna elements 105-1 to 105-3). Thus, the combined directional patterns Pa to Ph are stored in the directional pattern table memory 104 in different orders for different combinations of the relative strengths of received signals. Accordingly, each row of the table shown in FIG. 10 forms a group including a plurality of combined directional patterns which are ordered differently for different combinations of the relative strengths of received signals (hereinafter, referred to as "combined directional pattern group"). The relative strengths of received signals are information on signals received when a predetermined initial combined directional pattern is set on the steerable antenna elements 105-1 to 105-3, and include, for example, information on a radio propagation environment indicating, for example, which of the steerable antenna elements 105-1 to 105-3 (i.e., which azimuth angle) has a high received signal strength. The wireless communication apparatus 101 of the present embodiment can estimate a desired combined directional pattern based on such information. The priority corresponds to certainty as to whether or not an estimated combined directional pattern is suitable for the current radio propagation environment. For the initial combined directional pattern, it is preferred that an omni-directional pattern be set on each of the steerable antenna elements 105-1 to 105-3, and therefore, for example, a combined directional pattern Pa can be used.

Referring to FIG. 10, for example, referring to the first row of the table shown in FIG. 10, when RSSI1 is substantially equal to RSSI2 (i.e., the difference therebetween is less than or equal to a predetermined threshold value) and RSSI2 is substantially equal to RSSI3, the combined directional patterns Pa to Ph form a combined directional pattern group in which they are ordered in the following descending order of priority: "Ph, Pa, Pe, Pf, Pg, Pb, Pc, and Pd". In addition, referring to the second row of the table shown in FIG. 10, when RSSI1 is substantially greater than RSSI2 (i.e., the difference therebetween is greater than the predetermined threshold value) and RSSI2 is substantially greater than RSSI3, the combined directional patterns Pa to Ph form a combined directional pattern group in which they are ordered in the following descending order of priority: "Pc, Pg, Pd, Ph, Pe, Pf, Ph, and Pa". In a manner similar to that described above, for all combinations of the relative strengths of received signals, the combined directional patterns Pa to Ph are stored in the directional pattern table memory 104 as combined directional pattern groups in each of which they are ordered by different priority.

It can be considered that the relative strengths of received signals in the table shown in FIG. 10 represent the correlations between the steerable antenna elements 105-1 to 105-3.

Figure 11:
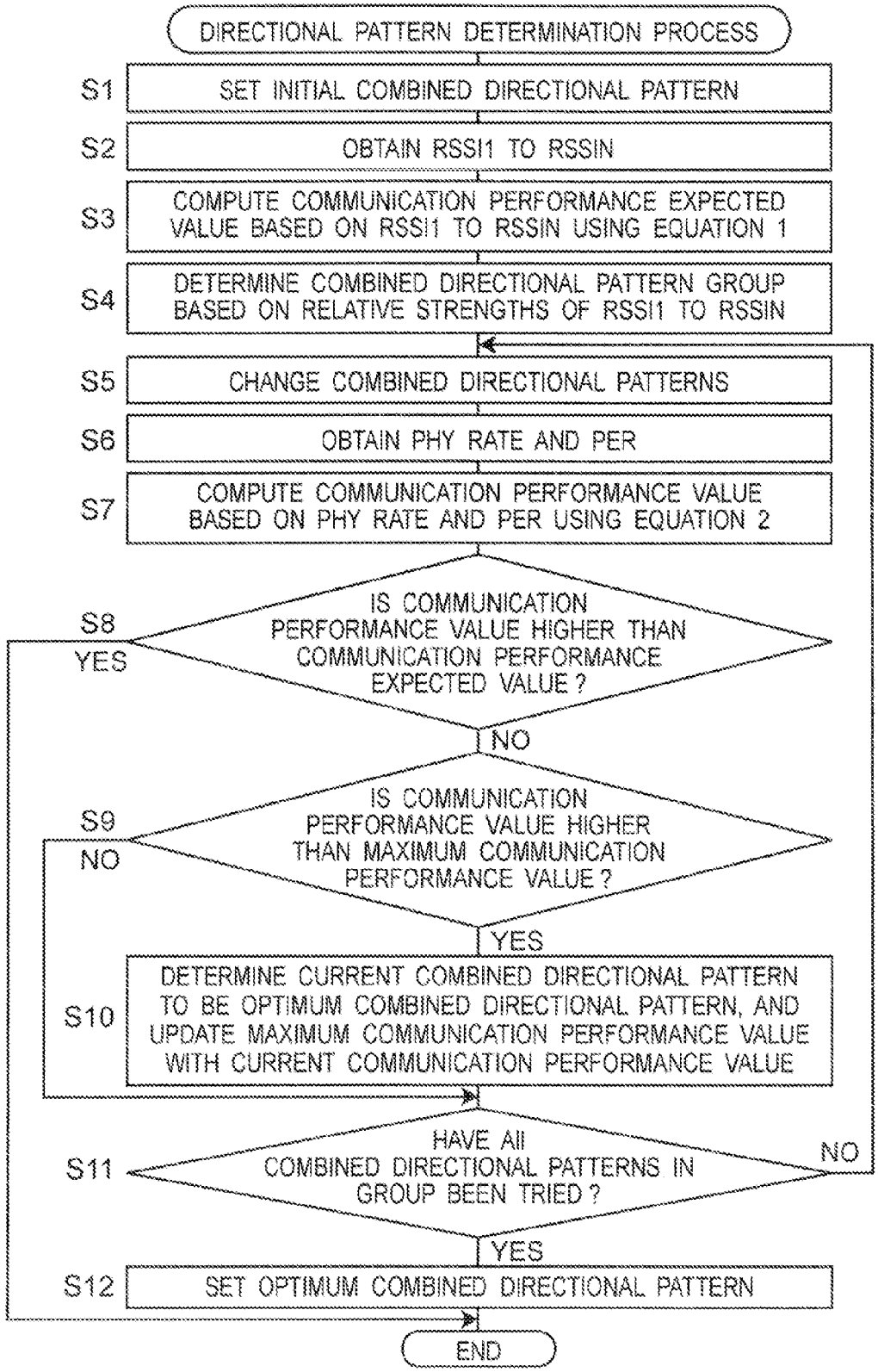
FIG. 11 is a flowchart showing a directional pattern determination process performed by a controller 103 of FIG. 1.

FIG. 11 is a flowchart showing a directional pattern determination process performed by the controller 103 of FIG. 1. The controller 103 starts a directional pattern determination process based on some criterion. The criterion to start the process is, for example, when the wireless communication apparatus 101 is powered on, when a certain time has elapsed since the start of communication, or when a change in radio propagation environment is detected. In step S1, the controller 103 sets a predetermined initial combined directional pattern on the steerable antenna elements 105-1 to 105-N. For example, when N=3, the controller 103 sets the combined directional pattern Pa on the steerable antenna elements 105-1 to 105-3 as the initial combined directional pattern. In step S2, the controller 103 obtains RSSI1 to RSSIN which are the RSSIs of signals received by the respective steerable antenna elements 105-1 to 105-N. In step S3, the controller 103 computes a communication performance expected value based on the obtained RSSI1 to RSSIN using a predetermined computation equation, the communication performance expected value being expected to be obtained in the current radio propagation environment. The computation equation for the communication performance expected value may differ depending on the values of RSSIs. An example of the computation equation on condition that the average value of RSSI1, . . . , RSSIN is ranged from −90 to −86 dB is shown in the following equation 1.

$$f(\text{RSSI1}, \ldots, \text{RSSIN}) = 0.9 \times 5 \times (\text{the average value of the RSSIs} + 90) \qquad \text{[Equation 1]}$$

In step S4, the controller 103 determines one of a plurality of combined directional pattern groups stored in the directional pattern table memory 104, based on the relative strengths of RSSI1 to RSSIN obtained in step S2.

In step S5, firstly, the controller 103 changes the combined directional patterns of the steerable antenna elements 105-1 to 105-N to set a combined directional pattern with the highest priority from the combined directional pattern group determined in step S4. In step S6, the controller 103 obtains a PHY rate and a PER. Preferably, the PHY rate and the PER are obtained during main data communication, without transmitting any extra measurement signals, etc. In step S7, the controller 103 computes a communication performance value obtained with the combined directional pattern set in step S5, based on the PHY rate and the PER using a predetermined computation equation. The computation equation for the communication performance value may differ depending on the radio propagation environment parameters such as the values of the PHY rate and PER. An example of the computation equation on condition that "PHY rate×(1−PER)" is 270 is shown in the following equation 2.

$$f(\text{PHY rate, PER})=67.96+0.067\times((\text{PRY rate}\times(1-\text{PER}))-270) \qquad [\text{Equation 2}]$$

The above-described equations 1 and 2 are approximately determined from a graph obtained through experiments conducted by the inventors. Equations 1 and 2 are not limited to those illustrated, and may differ depending on the circuit configuration of the wireless communication apparatus, and depending on the radio propagation environment, etc.

In step S8, the controller 103 determines whether or not the communication performance value is higher than the communication performance expected value. If YES, then the controller 103 continues to use the current combined directional pattern and ends the directional pattern determination process. On the other hand, if NO, then the controller 103 proceeds to step S9.

In step S9, the controller 103 determines whether or not the communication performance value is higher than the maximum communication performance value (the maximum value of the communication performance value: its initial value is set to, for example, 0.). If YES, then the controller 103 proceeds to step S10. If NO, then the controller 103 proceeds to step S11. In step S10, the controller 103 determines the current combined directional pattern to be an optimum combined directional pattern (i.e., an optimum combined directional pattern for the current radio propagation environment), updates the maximum communication performance value with the current communication performance value, and stores the optimum combined directional pattern and the maximum communication performance value, and proceeds to step S11. In step S11, the controller 103 determines whether or not all combined directional patterns from the combined directional pattern group determined in step S4 have been tried. If YES, then the controller 103 proceeds to step S12. If NO, then the controller 103 returns to step S5. When returning to step S5 from step S11, the controller 103 changes the combined directional patterns of the steerable antenna elements 105-1 to 105-N to set a combined directional pattern with the second highest priority from the combined directional pattern group determined in step S4, and repeats the subsequent steps. While repeating steps S5 to S11, the combined directional patterns are sequentially changed in descending order of priority, and if the communication performance value is higher than the communication performance expected value (if YES in step S8), then the process ends, otherwise, then in steps S9 and S10, the optimum combined directional pattern and the maximum communication performance value are updated and process is repeated. If no combined directional pattern with a communication performance value higher than the communication performance expected value can eventually be found even though trying all combined directional patterns from the combined directional pattern group determined in step S4, then in step S12, the controller 103 sets a combined directional pattern determined to be an optimum combined directional pattern (i.e., a combined directional pattern with the highest communication performance value) on the steerable antenna elements 105-1 to 105-N, and ends the process.

Thereafter, communication continues with the set combined directional pattern until a change in radio propagation environment is detected.

In the wireless communication apparatus 101 of the present embodiment, each of the steering control circuits 106-1 to 106-N, the controller 103, and the directional pattern table memory 104 may be implemented by hardware or may be implemented by software. In addition, the directional patterns of the respective steerable antenna elements 105-1 to 105-N can be changed using any method known to those skilled in the art.

The directional patterns of the steerable antenna elements 105-1 to 105-N are not limited to those in the embodiment that are handled as a "combined directional pattern" which is a superposition of a plurality of N directional patterns, and may be handled separately. For example, when a plurality of directional patterns are set on each of at least one steerable antenna element, it is possible to apply the principle of the present embodiment.

As described above, according to the wireless communication apparatus 101 of the present embodiment, it is possible to rapidly change the combined directional patterns of the steerable antenna elements 105-1 to 105-N in response to a change in radio propagation environment, thus enabling stable data communication.

Second Embodiment

In the first embodiment, the relative strengths of received signals obtained when one initial combined directional pattern is set are used in order to determine one combined directional pattern group from among those groups stored in the directional pattern table memory 104. On the other hand, the second embodiment is characterized in that the relative strengths of received signals obtained when two initial combined directional patterns are set are used by comparison. The configuration of a wireless communication apparatus 101 of the present embodiment is the same as that in the first embodiment (see FIG. 1). The content of the directional pattern table memory 104 and a directional pattern determination process performed by a controller 103 differ from those in the first embodiment.

FIG. 12 is a table showing the content of the directional pattern table memory 104 according to the second embodiment of the present invention. RSSI11, RSSI12, and RSSI13 indicate the RSSIs of signals received by respective steerable antenna elements 105-1 to 105-3 when a predetermined first initial combined directional pattern is set on the steerable antenna elements 105-1 to 105-3. RSSI21, RSSI22, and RSSI23 indicate the RSSIs of signals received by the respective steerable antenna elements 105-1 to 105-3 when a predetermined second initial combined directional pattern different from the first initial combined directional pattern is set on the steerable antenna elements 105-1 to 105-3. For the first initial combined directional pattern, it is preferred that an omni-directional pattern be set on each of the steerable antenna elements 105-1 to 105-3, and therefore, for example, a combined directional pattern Pa can be used. For the second initial combined directional pattern, it is preferred that directional patterns completely different from the directional patterns included in the first initial combined directional pattern (e.g., directional patterns with a narrow beam width) be set on the respective steerable antenna elements 105-1 to 105-3, and therefore, for example, a combined directional pattern Ph can be used. In the present embodiment, combined directional patterns Pa to Ph are assigned different priorities according to the relative strengths of signals received when the first initial combined directional pattern is set, to signals received when the second initial combined directional pattern is set (i.e., the relative strengths of RSSI11 to RSSI21, the relative strengths of RSSI12 to RSSI22, and the relative strengths of RSSI13 to RSSI23). Thus, the combined directional patterns Pa to Ph are stored in the directional pattern table memory 104 in different orders for different combinations of the relative strengths of received signals. Accordingly, each row of the table shown in FIG. 12 forms a combined directional pattern group including a plurality of combined directional patterns which are ordered differently for different combinations of the relative strengths of received signals.

Referring to FIG. 12, for example, referring to the first row of the table shown in FIG. 12, when RSSI11 is substantially equal to RSSI21 (i.e., the difference therebetween is less than or equal to a predetermined threshold value), RSSI12 is substantially equal to RSSI22, and RSSI13 is substantially equal to RSSI23, the combined directional patterns Pa to Ph form a combined directional pattern group in which they are ordered in the following descending order of priority: "Ph, Pa, Pe, Ph, Pg, Pb, Pc, and Pd". In this combined directional pattern group, the combined directional pattern Pf is not used. In addition, referring to the second row of the table shown in FIG. 12, when RSSI11 is substantially greater than RSSI21 (i.e., the difference therebetween is greater than the predetermined threshold value), RSSI12 is substantially equal to RSSI22, and RSSI13 is substantially equal to RSSI23, the combined directional patterns Pa to Ph form a combined directional pattern group in which they are ordered in the following descending order of priority: "Pg, Pa, Pc, Pd, Ph, Pe, Pf, and Pb". In a mariner similar to that described above, for all combinations of the relative strengths of received signals, the combined directional patterns Pa to Ph are stored in the directional pattern table memory 104 as combined directional pattern groups in each of which they are ordered by different priority.

Figure 13:
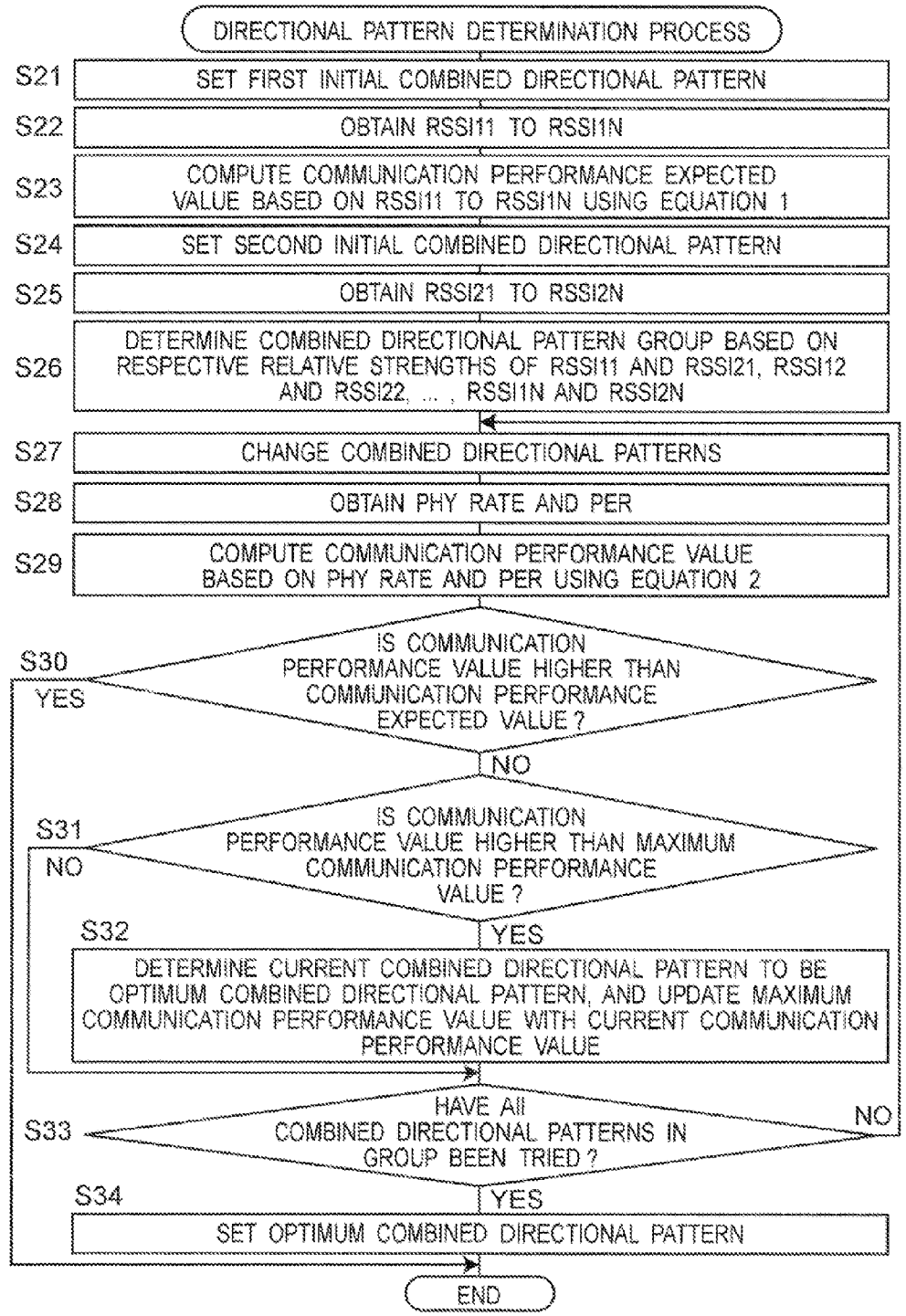
FIG. 13 is a flowchart showing a directional pattern determination process performed by a controller 103 according to the second embodiment of the present invention.

FIG. 13 is a flowchart showing a directional pattern determination process performed by the controller 103 according to the second embodiment of the present invention. The controller 103 starts a directional pattern determination process based on some criterion. The criterion to start the process is, for example, when the wireless communication apparatus 101 is powered on, when a certain time has elapsed since the start of communication, or when a change in radio propagation environment is detected. In step S21, the controller 103 sets a predetermined first initial combined directional pattern on the steerable antenna elements 105-1 to 105-N. For example, when N=3, the controller 103 sets the combined directional pattern Pa on the steerable antenna elements 105-1 to 105-3 as the first initial combined directional pattern. In step S22, the controller 103 obtains RSSI11 to RSSI1N which are the RSSIs of signals received by the respective steerable antenna elements 105-1 to 105-N. In step S23, the controller 103 computes a communication performance expected value based on RSSI11 to RSSI1N obtained in step S22, using equation 1. In step S24, the controller 103 sets a predetermined second initial combined directional pattern on the steerable antenna elements 105-1 to 105-N. For example, when N=3, the controller 103 sets the combined directional pattern Ph on the steerable antenna elements 105-1 to 105-3 as the second initial combined directional pattern. In step S25, the controller 103 obtains RSSI21 to RSSI2N which are the RSSIs of signals received by the respective steerable antenna elements 105-1 to 105-N. In step S26, the controller 103 determines one of a plurality of combined directional pattern groups stored in the directional pattern table memory 104, based on the relative strengths of RSSI11 to RSSI21, the relative strengths of RSSI12 to RSSI22, the relative strengths of RSSI1N to RSSI2N obtained in steps S22 and S25.

Steps S27 to S34 are substantially the same as steps S5 to S12 of FIG. 11. In step S27, firstly, the controller 103 changes the combined directional patterns of the steerable antenna elements 105-1 to 105-N to set a combined directional pattern with the highest priority from the combined directional pattern group determined in step S26. In step S28, the controller 103 obtains a PHY rate and a PER. Preferably, the PHY rate and the PER are obtained during main data communication, without transmitting any extra measurement signals, etc. In step S29, the controller 103 computes a communication performance value based on the PHY rate and the PER using equation 2. In step S30, the controller 103 determines whether or not the communication performance value is higher than the communication performance expected value. If YES, then the controller 103 continues to use the current combined directional pattern and ends the directional pattern determination process. On the other hand, if NO, then the controller 103 proceeds to step S31.

In step S31, the controller 103 determines whether or not the communication performance value is higher than the maximum communication performance value. If YES, then the controller 103 proceeds to step S32. If NO, then the controller 103 proceeds to step S33. In step S32, the controller 103 determines the current combined directional pattern to be an optimum combined directional pattern, updates the maximum communication performance value with the current communication performance value, and stores the optimum combined directional pattern and the maximum communication performance value, and proceeds to step S33. In step S33, the controller 103 determines whether or not all combined directional patterns from the combined directional pattern group determined in step S26 have been tried. If YES, then the controller 103 proceeds to step S34. If NO, then the controller 103 returns to step S27. When returning to step S27 from step S33, the controller 103 changes the combined directional patterns of the steerable antenna elements 105-1 to 105-N to set a combined directional pattern with the second highest priority from the combined directional pattern group determined in step S26, and repeats the subsequent steps. While repeating steps S27 to S33, the combined directional patterns are sequentially changed in descending order of priority. If the communication performance value is higher than the communication performance expected value (if YES in step S30), then the process ends, otherwise, then in steps S31 and S32, the optimum combined directional pattern and the maximum communication performance value are updated and process is repeated. If no combined directional pattern with a communication performance value higher than the communication performance expected value can eventually be found even though trying all combined directional patterns from the combined directional pattern group determined in step S26, then in step S34, the controller 103 sets a combined directional pattern determined to be an optimum combined directional pattern (i.e., a combined directional pattern with the highest communication performance value) on the steerable antenna elements 105-1 to 105-N, and ends the process.

Thereafter, communication continues with the set combined directional pattern until a change in radio propagation environment is detected.

As described above, according to the wireless communication apparatus 101 of the present embodiment, it is possible to rapidly change the combined directional patterns of the steerable antenna elements 105-1 to 105-N in response to a change in radio propagation environment, thus enabling stable data communication.

Third Embodiment

An embodiment of the present invention is not limited to the case of using a plurality of combined directional pattern groups, as in the first and second embodiments. For simplification, only one combined directional pattern group may be used. The configuration of a wireless communication apparatus 101 of the present embodiment is the same as that in the first embodiment (see FIG. 1). The content of a directional pattern table memory 104 and a directional pattern determination process performed by a controller 103 differ from those in the first embodiment.

Figure 14:
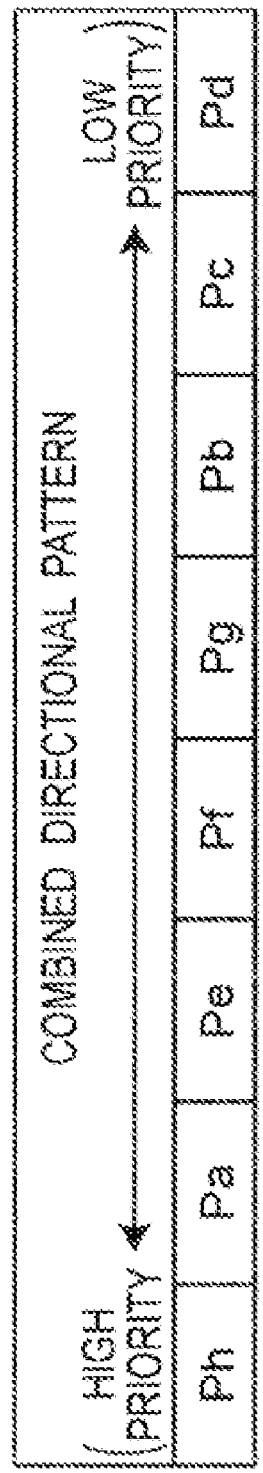
FIG. 14 is a table showing the content of a directional pattern table memory 104 according to a third embodiment of the present invention.

FIG. 14 is a table showing the content of the directional pattern table memory 104 according to a third embodiment of the present invention. In the present embodiment, combined directional patterns Pa to Ph are assigned priority. The combined directional patterns Pa to Ph are stored in the directional pattern table memory 104 in a predetermined order by the priority.

Figure 15:
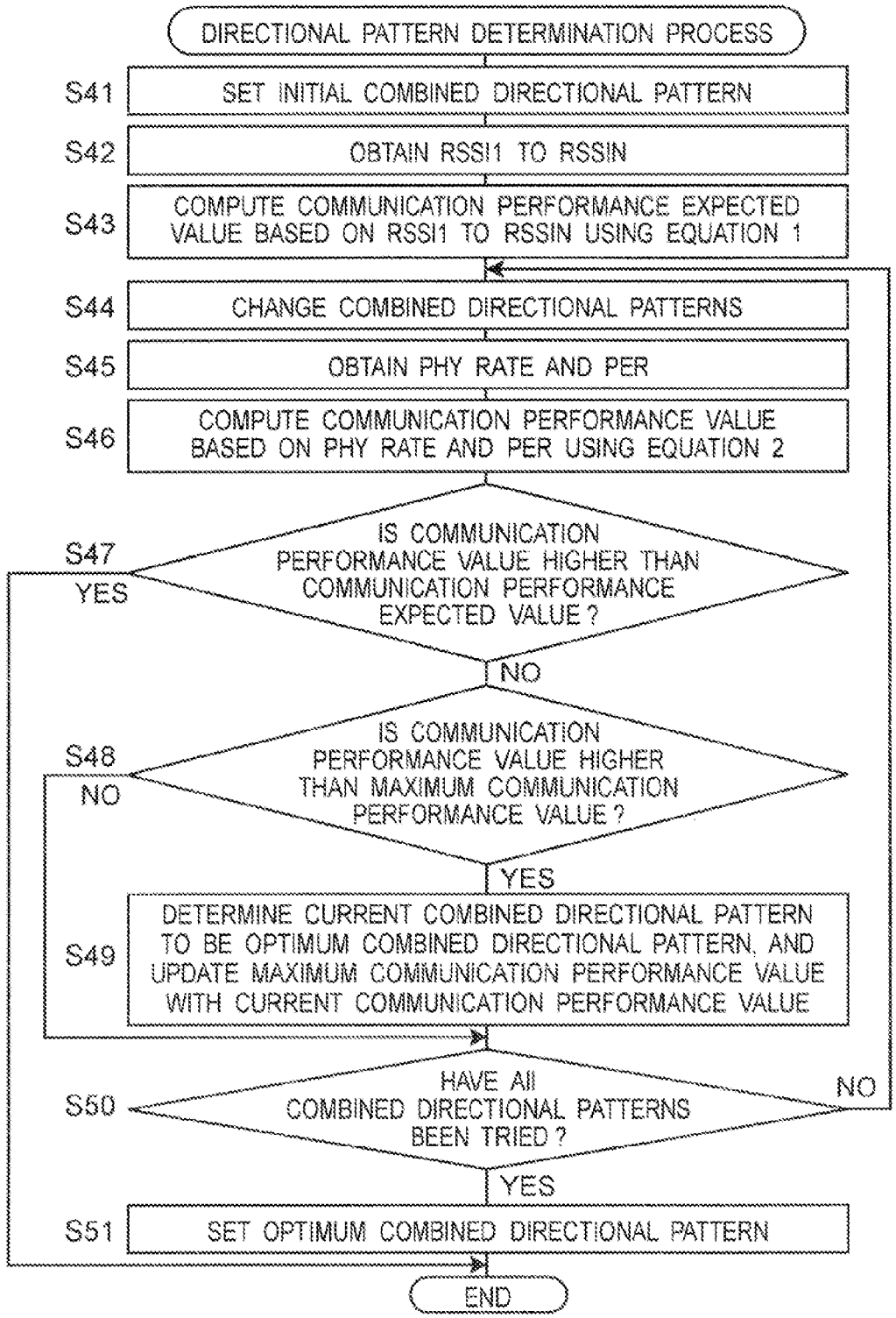
FIG. 15 is a flowchart showing a directional pattern determination process performed by a controller 103 according to the third embodiment of the present invention.

FIG. 15 is a flowchart showing a directional pattern determination process performed by the controller 103 according to the third embodiment of the present invention. The directional pattern determination process of the present embodiment is substantially the same as the directional pattern determination processes of the first and second embodiments, except for not including the step of determining one of a plurality of directional pattern groups (step S4 of FIG. 11 and steps S24 to S26 of FIG. 13).

Steps S41 to S43 are substantially the same as steps S1 to S3 of FIG. 11. The controller 103 starts a directional pattern determination process based on some criterion. The criterion to start the process is, for example, when the wireless communication apparatus 101 is powered on, when a certain time has elapsed since the start of communication, or when a change in radio propagation environment is detected. In step S41, the controller 103 sets a predetermined initial combined directional pattern on steerable antenna elements 105-1 to 105-N. For the initial combined directional pattern, it is preferred that an omni-directional pattern be set on each of the steerable antenna elements 105-1 to 105-3, and therefore, for example, a combined directional pattern Pa can be used. In step S42, the controller 103 obtains RSSI1 to RSSIN which are the RSSIs of signals received by the respective steerable antenna elements 105-1 to 105-N. In step S43, the controller 103 computes a communication performance expected value based on RSSI1 to RSSIN obtained in step S42, using equation 1.

Steps S44 to S51 are substantially the same as steps S5 to S12 of FIG. 11. In step S44, the controller 103 first changes the combined directional patterns of the steerable antenna elements 105-1 to 105-N to set a combined directional pattern with the highest priority among the combined directional patterns stored in the directional pattern table memory 104. In step S45, the controller 103 obtains a PHY rate and a PER. Preferably, the PHY rate and the PER are obtained during main data communication, without transmitting any extra measurement signals, etc. In step S46, the controller 103 computes a communication performance value based on the PHY rate and the PER using equation 2. In step S47, the controller 103 determines whether or not the communication performance value is higher than the communication performance expected value. If YES, then the controller 103 continues to use the current combined directional pattern and ends the directional pattern determination process. On the other hand, if NO, then the controller 103 proceeds to step S48.

In step S48, the controller 103 determines whether or not the communication performance value is higher than the maximum communication performance value. If YES, then the controller 103 proceeds to step S49. If NO, then the controller 103 proceeds to step S50. In step S49, the controller 103 determines the current combined directional pattern to be an optimum combined directional pattern, updates the maximum communication performance value with the current communication performance value, and stores the optimum combined directional pattern and the maximum communication performance value, and proceeds to step S50. In step S50, the controller 103 determines whether or not all combined directional patterns stored in the directional pattern table memory 104 have been tried. If YES, then the controller 103 proceeds to step S51. If NO, then the controller 103 returns to step S44. When returning to step S44 from step S50, the controller 103 changes the combined directional patterns of the steerable antenna elements 105-1 to 105-N to set a combined directional pattern with the second highest priority among the combined directional patterns stored in the directional pattern table memory 104, and repeats the subsequent steps. While repeating steps S44 to S50, the combined directional patterns are sequentially changed in descending order of priority. If the communication performance value is higher than the communication performance expected value (if YES in step S47), then the process ends, otherwise, then in steps S48 and S49, the optimum combined directional pattern and the maximum communication performance value are updated and process is repeated. If no combined directional pattern with a communication performance value higher than the communication performance expected value can eventually be found even though trying all combined directional patterns stored in the directional pattern table memory 104, then in step S51, the controller 103 sets a combined directional pattern determined to be an optimum combined directional pattern (i.e., a combined directional pattern with the highest communication performance value) on the steerable antenna elements 105-1 to 105-N, and ends the process.

Thereafter, communication continues with the set combined directional pattern until a change in radio propagation environment is detected.

As described above, according to the wireless communication apparatus 101 of the present embodiment, it is possible to rapidly change the combined directional patterns of the steerable antenna elements 105-1 to 105-N in response to a change in radio propagation environment, thus enabling stable data communication. Further, according to the wireless communication apparatus 101 of the present: embodiment, since the process is simplified over those in the first and second embodiments, it is possible to more rapidly change the combined directional patterns of the steerable antenna elements 105-1 to 105-N.

INDUSTRIAL APPLICABILITY

Wireless communication apparatuses and wireless communication methods provided by the present invention can be used, of course, for data communication not requiring much real-time performance such as web browsing performed mainly on a personal computer, and can also be used for data communication requiring stability and real-time performance such as communication of video data processed by a television apparatus or an HDD/DVD recorder with the network capability.

REFERENCE SIGNS LIST

101: WIRELESS COMMUNICATION APPARATUS,
102: STEERABLE ARRAY ANTENNA APPARATUS,

103: CONTROLLER,
104: DIRECTIONAL PATTERN TABLE MEMORY,
105-1 to 105-N: STEERABLE ANTENNA ELEMENT,
106-1 to 106-N: STEERING CONTROL CIRCUIT,
107-1 to 107-N: HIGH-FREQUENCY PROCESSING CIRCUIT,
108: BASEBAND PROCESSING CIRCUIT,
109: MAC PROCESSING CIRCUIT, and
B1, B2, and B3: DIRECTIONAL PATTERN.

The invention claimed is:

1. A wireless communication apparatus comprising:
a plurality of steerable antenna apparatuses;
a directional pattern table memory for storing a plurality of combined directional patterns, each of the combined directional patterns being a superposition of a plurality of directional patterns set on the plurality of steerable antenna apparatuses, respectively;
a controller for controlling directional patterns of the respective steerable antenna apparatuses to set a combined directional pattern stored in the directional pattern table memory; and
demodulation circuits for demodulating a plurality of signals received by the plurality of steerable antenna apparatuses, respectively,
wherein the directional pattern table memory stores the plurality of combined directional patterns so as to form a plurality of combined directional pattern groups in each of which the plurality of combined directional patterns are ordered by different predetermined priority according to a different radio propagation environment, and
wherein the controller:
computes a communication performance expected value based on a first radio propagation environment parameter for signals received when a predetermined initial combined directional pattern is set on the steerable antenna apparatuses, and
selects one of the combined directional pattern groups based on the first radio propagation environment parameter; and
according to the priority, sequentially sets respective combined directional patterns included in the selected one combined directional pattern group, on the steerable antenna apparatuses, computes a communication performance value based on the second radio propagation environment parameter for signals received at each of sequential settings, and performs communication using a combined directional pattern with a communication performance value that first exceeds the communication performance expected value,
wherein the first radio propagation environment parameter includes received signal strengths of signals received by the respective steerable antenna apparatuses,
wherein the second radio propagation environment parameter includes a wireless physical transmission rate and a packet error rate of signals received and demodulated,
wherein the directional pattern table memory stores the plurality of combined directional patterns so as to form the plurality of combined directional pattern groups each corresponding to a different combination of relative strengths of received signal strengths of signals received by the respective steerable antenna apparatuses, and
wherein the controller selects one of the combined directional pattern groups based on relative strengths of received signal strengths of signals received by the respective steerable antenna apparatuses when the initial combined directional pattern is set on the steerable antenna apparatuses.

2. A wireless communication apparatus comprising:
a plurality of steerable antenna apparatuses;
a directional pattern table memory for storing a plurality of combined directional patterns, each of the combined directional patterns being a superposition of a plurality of directional patterns set on the plurality of steerable antenna apparatuses, respectively;
a controller for controlling directional patterns of the respective steerable antenna apparatuses to set a combined directional pattern stored in the directional pattern table memory; and
demodulation circuits for demodulating a plurality of signals received by the plurality of steerable antenna apparatuses, respectively,
wherein the directional pattern table memory stores the plurality of combined directional patterns so as to form a plurality of combined directional pattern groups in each of which the plurality of combined directional patterns are ordered by different predetermined priority according to a different radio propagation environment, and
wherein the controller:
computes a communication performance expected value based on a first radio propagation environment parameter for signals received when a predetermined initial combined directional pattern is set on the steerable antenna apparatuses, and
selects one of the combined directional pattern groups based on the first radio propagation environment parameter; and
according to the priority, sequentially sets respective combined directional patterns included in the selected one combined directional pattern group, on the steerable antenna apparatuses, computes a communication performance value based on the second radio propagation environment parameter for signals received at each of sequential settings, and performs communication using a combined directional pattern with a communication performance value that first exceeds the communication performance expected value,
wherein the first radio propagation environment parameter includes received signal strengths of signals received by the respective steerable antenna apparatuses, and
wherein the second radio propagation environment parameter includes a wireless physical transmission rate and a packet error rate of signals received and demodulated,
wherein the initial combined directional pattern includes a first initial combined directional pattern and a second initial combined directional pattern different from each other,
wherein the directional pattern table memory stores the plurality of combined directional patterns so as to form the plurality of combined directional pattern groups each corresponding to a different combination of relative strengths of first received signal strengths to second received signal strengths, the first received signal strengths being received signal strengths of signals received by the respective steerable antenna apparatuses when the first initial combined directional pattern is set on the steerable antenna apparatuses, and the second received signal strengths being received signal strengths of signals received by the respective steerable antenna apparatuses when the second initial combined directional pattern is set on the steerable antenna apparatuses, and wherein the controller selects one of the combined directional pattern groups based on relative strengths of the first received signal strengths to the second received signal strengths.

3. The wireless communication apparatus as claimed in claim 1,
wherein the initial combined directional pattern is an omni-directional pattern.

4. The wireless communication apparatus as claimed in claim 2,
wherein the first initial combined directional pattern is an omni-directional pattern, and the second initial combined directional pattern is a directional pattern different from an omni-directional pattern.

5. A wireless communication method for controlling directional patterns of a plurality of steerable antenna apparatuses in a wireless communication apparatus, the wireless communication apparatus comprises:
the plurality of steerable antenna apparatuses;
a directional pattern table memory for storing a plurality of combined directional patterns, each of the combined directional patterns being a superposition of a plurality of directional patterns set on the plurality of steerable antenna apparatuses, respectively;
demodulation circuits for demodulating a plurality of signals received by the plurality of steerable antenna apparatuses, respectively,
the wireless communication method comprising the steps of:
storing the plurality of combined directional patterns in the directional pattern table memory so as to form a plurality of combined directional pattern groups in each of which the plurality of combined directional patterns are ordered by different predetermined priority according to a different radio propagation environment,
computing a communication performance expected value based on a first radio propagation environment parameter for signals received when a predetermined initial combined directional pattern is set on the steerable antenna apparatuses; and
selecting one of the combined directional pattern groups based on the first radio propagation environment parameter, and
according to the priority, sequentially setting respective combined directional patterns included in the selected one combined directional pattern group, on the steerable antenna apparatuses; computing a communication performance value based on the second radio propagation environment parameter for signals received at each of sequential settings; and performing communication using a combined directional pattern with a communication performance value that first exceeds the communication performance expected value,
wherein the first radio propagation environment parameter includes received signal strengths of signals received by the respective steerable antenna apparatuses,
wherein the second radio propagation environment parameter includes a wireless physical transmission rate and a packet error rate of signals received and demodulated,
wherein the step of storing includes storing the plurality of combined directional patterns in the directional pattern table memory so as to form the plurality of combined directional pattern groups each corresponding to a different combination of relative strengths of received signal strengths of signals received by the respective steerable antenna apparatuses, and wherein the step of selecting includes selecting one of the combined directional pattern groups based on relative strengths of received signal strengths of signals received by the respective steerable antenna apparatuses when the initial combined directional pattern is set on the steerable antenna apparatuses.

6. A wireless communication method for controlling directional patterns of a plurality of steerable antenna apparatuses in a wireless communication apparatus, the wireless communication apparatus comprises:
the plurality of steerable antenna apparatuses;
a directional pattern table memory for storing a plurality of combined directional patterns, each of the combined directional patterns being a superposition of a plurality of directional patterns set on the plurality of steerable antenna apparatuses, respectively;
demodulation circuits for demodulating a plurality of signals received by the plurality of steerable antenna apparatuses, respectively,
the wireless communication method comprising the steps of:
storing the plurality of combined directional patterns in the directional pattern table memory so as to form a plurality of combined directional pattern groups in each of which the plurality of combined directional patterns are ordered by different predetermined priority according to a different radio propagation environment,
computing a communication performance expected value based on a first radio propagation environment parameter for signals received when a predetermined initial combined directional pattern is set on the steerable antenna apparatuses; and
selecting one of the combined directional pattern groups based on the first radio propagation environment parameter, and
according to the priority, sequentially setting respective combined directional patterns included in the selected one combined directional pattern group, on the steerable antenna apparatuses; computing a communication performance value based on the second radio propagation environment parameter for signals received at each of sequential settings; and performing communication using a combined directional pattern with a communication performance value that first exceeds the communication performance expected value,
wherein the first radio propagation environment parameter includes received signal strengths of signals received by the respective steerable antenna apparatuses,
wherein the second radio propagation environment parameter includes a wireless physical transmission rate and a packet error rate of signals received and demodulated,
wherein the initial combined directional pattern includes a first initial combined directional pattern and a second initial combined directional pattern different from each other,
wherein the step of storing includes storing the plurality of combined directional patterns in the directional pattern table memory so as to form the plurality of combined directional pattern groups each corresponding to a different combination of relative strengths of first received signal strengths to second received signal strengths, the first received signal strengths being received signal strengths of signals received by the respective steerable antenna apparatuses when the first initial combined directional pattern is set on the steerable antenna apparatuses, and the second received signal strengths being received signal strengths of signals received by the respective steerable antenna apparatuses when the second initial combined directional pattern is set on the steerable antenna apparatuses, and wherein the step of selecting includes selecting one of the combined directional pattern groups based on relative strengths of the first received signal strengths to the second received signal strengths.

7. The wireless communication method as claimed in claim 5,
wherein the initial combined directional pattern is an omni-directional pattern.

8. The wireless communication method as claimed in claim 6,
wherein the first initial combined directional pattern is an omni-directional pattern, and the second initial combined directional pattern is a directional pattern different from an omni-directional pattern.

* * * * *